United States Patent
Choi et al.

(10) Patent No.: US 7,851,399 B2
(45) Date of Patent: Dec. 14, 2010

(54) METHOD OF MAKING CHALCOGEN CATALYSTS FOR POLYMER ELECTROLYTE FUEL CELLS

(75) Inventors: Jong-Ho Choi, Los Alamos, NM (US); Piotr Zelenay, Los Alamos, NM (US); Andrzej Wieckowski, Champaign, IL (US); Dianxue Cao, Harabin (CN)

(73) Assignee: Los Alamos National Security, LLC, Los Alamos, NM (US)

( * ) Notice: Subject to any disclaimer, the term of this patent is extended or adjusted under 35 U.S.C. 154(b) by 1042 days.

(21) Appl. No.: 11/443,809

(22) Filed: May 31, 2006

(65) Prior Publication Data

US 2007/0281852 A1 Dec. 6, 2007

(51) Int. Cl.
*H01M 4/88* (2006.01)
*H01M 4/90* (2006.01)
*B05D 5/12* (2006.01)

(52) U.S. Cl. .............. 502/216; 429/523; 429/524; 429/526

(58) Field of Classification Search .............. 429/40, 429/42, 44, 523–526; 423/508–511; 502/101, 502/215, 216, 219–223
See application file for complete search history.

(56) References Cited

U.S. PATENT DOCUMENTS

2002/0102451 A1   8/2002   Acker et al.
2004/0096728 A1 *  5/2004   Campbell ............ 429/40
2006/0105210 A1   5/2006   Surampudi et al.

OTHER PUBLICATIONS

Zelenay et al., "Chalcogen Catalysts for Polymer Electrolyte Fuel Cell," U.S. Appl. No. 11/295,361, filed Dec. 5, 2005.
Alonso-Vante et al., "The Structure Analysis of the Active Center of Ru-Containing Electrocatalysts for the Oxygen Reduction. An In Situ EXAFS Study," Electrochimica Acta 47 (2002) 3807-3814.
Solorza-Feria et al., "Novel Low-Temperature Synthesis of Semicnducting Transition Metal Chalcogenide electrocatalyst for Multielectron Charge Transfer: molecular Oxygen Reduction," Electrochimica Acta, vol. 39, No. 11/12, pp. 1647-1653, (1994).
Malakhov, et al., "In Situ EXAFS Study to Probe Active Centers of Ru Chalcogenide Electrocatalysts During Oxygen Reduction Reaction," J. Phys. Chem. B 2002, 106, 1670-1676.
Zhang et al., "Progress in Preparation of Non-Noble Electrocatalysts for PEM Fuel Cell Reactions," Journal of Power Sources xxx (2005) xxx-xxx.

* cited by examiner

*Primary Examiner*—Gregg Cantelmo
(74) *Attorney, Agent, or Firm*—Robert P. Santandrea; Juliet A. Jones

(57) ABSTRACT

A method of making an electrode catalyst material using aqueous solutions. The electrode catalyst material includes a support comprising at least one transition metal and at least one chalcogen disposed on a surface of the transition metal. The method includes reducing a metal powder, mixing the metal powder with an aqueous solution containing at least one inorganic compound of the chalcogen to form a mixture, and providing a reducing agent to the mixture to form nanoparticles of the electrode catalyst. The electrode catalyst may be used in a membrane electrode assembly for a fuel cell.

26 Claims, 12 Drawing Sheets

METHOD OF MAKING CHALCOGEN CATALYSTS FOR POLYMER ELECTROLYTE FUEL CELLS

STATEMENT REGARDING FEDERAL RIGHTS

This invention was made with government support under Contract No. W-7405-ENG-36, awarded by the U.S. Department of Energy. The government has certain rights in the invention.

BACKGROUND OF INVENTION

The invention relates to fuel cells. More particularly, the invention relates to materials for fuel cell cathodes. Even more particularly, the invention relates to methods of making materials for fuel cell cathodes.

Polymer electrolyte fuel cells (PEFCs), including direct methanol fuel cells (DMFCs) have attracted great interest as an alternative power source for vehicles and portable electronic devices. Factors that significantly reduce the efficiency of DMFCs include sluggish methanol oxidation at the anode, sluggish oxygen reduction reaction (ORR) at the cathode, and methanol crossover. The sluggish methanol oxidation and ORR cause a large overpotential at the anode and the cathode, respectively, thus dramatically reducing cell voltage. Methanol crossover is the permeation of methanol through the solid electrolyte membrane from the anode to the cathode, where it is oxidized. The simultaneous ORR and oxidation of methanol at the cathode lead to an additional reduction of the cathode potential and decrease in DMFC performance.

Platinum and platinum-based metal alloys are, at present, the most widely used ORR catalysts in DMFCs. Efforts have been made to develop alternative ORR catalysts other than platinum that are either inactive or sufficiently tolerant to methanol. Nano-cluster $Mo_xRu_ySe_z$ and $Ru_xSe_y$ compounds, for example, have been prepared from ruthenium carbonyl precursors in the presence of organic solvents, such as xylenes. Such methods require the use of toxic carbonyl complexes and organic solvents. While aqueous routes to the production of such catalysts have been reported, such methods require the use of potentially toxic materials, such as elemental selenium, as well.

Methods of making highly active, methanol tolerant cathode catalysts currently employ organic solvents, as well as other potentially toxic materials, or both. Therefore, what is needed is a method of making fuel cell catalyst materials that is carried out in aqueous solution without the use of toxic materials. What is also needed are high efficiency electrode catalysts that are made by such a method.

SUMMARY OF INVENTION

The present invention meets these and other needs by providing a method of making an electrode catalyst material using aqueous solutions. The electrode catalyst material includes a support comprising at least one transition metal and at least one chalcogen disposed on a surface of the transition metal. The method includes reducing a metal powder, mixing the metal powder with an aqueous solution containing an inorganic chalcogen compound to form a mixture, and providing a reducing agent to the mixture to form nanoparticles of the electrode catalyst. The electrode catalyst may be used in a membrane electrode assembly for a fuel cell.

Accordingly, one aspect of the invention is to provide a method of making a cathode catalyst. The cathode catalyst comprises a support comprising at least one transition metal in elemental form, and at least one chalcogen in elemental form disposed on at least a portion of a surface of the support. The method comprises the steps of: providing the at least one transition metal in powder form; reducing the at least one transition metal; providing an aqueous solution comprising at least one inorganic compound of the at least one chalcogen; combining the at least one transition metal with the aqueous solution to form a mixture; providing a reducing agent to the mixture to form solid nanoparticles of the cathode catalyst, the solid nanoparticles comprising the at least one transition metal and the at least one chalcogen; and collecting the solid nanoparticles.

A second aspect of the invention is to provide a method of making a catalytic material. The cathode material comprises at least one transition metal in elemental form and at least one chalcogen in elemental form disposed on at least a portion of a surface of the at least one transition metal. The method comprises the steps of: providing the at least one transition metal in powder form; reducing the at least one transition metal; providing an aqueous solution comprising at least one inorganic compound of the at least one chalcogen; combining the at least one transition metal with the aqueous solution to form a mixture; and providing a reducing agent to the mixture to form solid nanoparticles of the catalytic material, the solid nanoparticles comprising the at least one transition metal and the at least one chalcogen.

A third aspect of the invention is to provide a method of making a membrane electrode assembly. The membrane electrode assembly comprises an ionomeric membrane, an anode catalyst disposed on a first surface of the ionomeric membrane, and a cathode catalyst disposed on a second surface of the ionomeric membrane. The cathode catalyst comprises: a support comprising at least one transition metal in elemental form capable of reducing oxygen; at least one chalcogen in elemental form disposed on at least a portion of a surface of the support; a recast ionomer dispersed throughout the support. The method comprises the steps of: providing at least one transition metal in elemental form as a powder; reducing the at least one transition metal; providing an aqueous solution comprising at least one inorganic compound of the at least one chalcogen; combining the at least one transition metal with the aqueous solution to form a mixture; providing a reducing agent to the mixture to form solid nanoparticles of the cathode catalyst, the solid nanoparticles comprising the at least one transition metal and the at least one chalcogen; collecting the solid nanoparticles; applying the cathode catalyst to the second surface of at least one of the ionomeric membrane and the second diffusion layer; and applying the anode catalyst to the first surface of the ionomeric membrane to form the membrane electrode assembly.

A fourth aspect of the invention is to provide a cathode catalyst for a polymer electrolyte fuel cell. The cathode catalyst comprises: a support comprising at least one transition metal in elemental form capable of reducing oxygen; at least one chalcogen in elemental form disposed on at least a portion of a surface of the support; and a recast ionomer dispersed throughout the support. The cathode catalyst is formed by: providing the at least one transition metal in elemental form as a powder; reducing the at least one transition metal; providing an aqueous solution comprising at least one inorganic compound of the at least one chalcogen; combining the at least one transition metal with the aqueous solution to form a mixture; providing a reducing agent to the mixture to form solid nanoparticles of the cathode catalyst, the solid nanoparticles comprising the at least one transition metal and the at least one chalcogen; and collecting the solid nanoparticles.

A fifth aspect of the invention is to provide a membrane electrode assembly for a fuel cell. The membrane electrode assembly comprises: an ionomeric membrane; an anode disposed on a first surface of the ionomeric membrane; and a cathode catalyst disposed on a second surface of the ionomeric membrane. The cathode catalyst comprises: a support comprising at least one transition metal in elemental form capable of reducing oxygen; at least one chalcogen in elemental form disposed on at least a portion of a surface of the support; and a recast ionomer dispersed throughout the support. The cathode catalyst is formed by: providing at least one transition metal in elemental form as a powder; reducing the at least one transition metal; providing an aqueous solution comprising at least one inorganic compound of the at least one chalcogen; combining the at least one transition metal with the aqueous solution to form a mixture; providing a reducing agent to the mixture to form solid nanoparticles of the cathode catalyst, the solid nanoparticles comprising the at least one transition metal and the at least one chalcogen; and collecting the solid nanoparticles.

These and other aspects, advantages, and salient features of the present invention will become apparent from the following detailed description, the accompanying drawings, and the appended claims.

DETAILED DESCRIPTION

Figure 1:
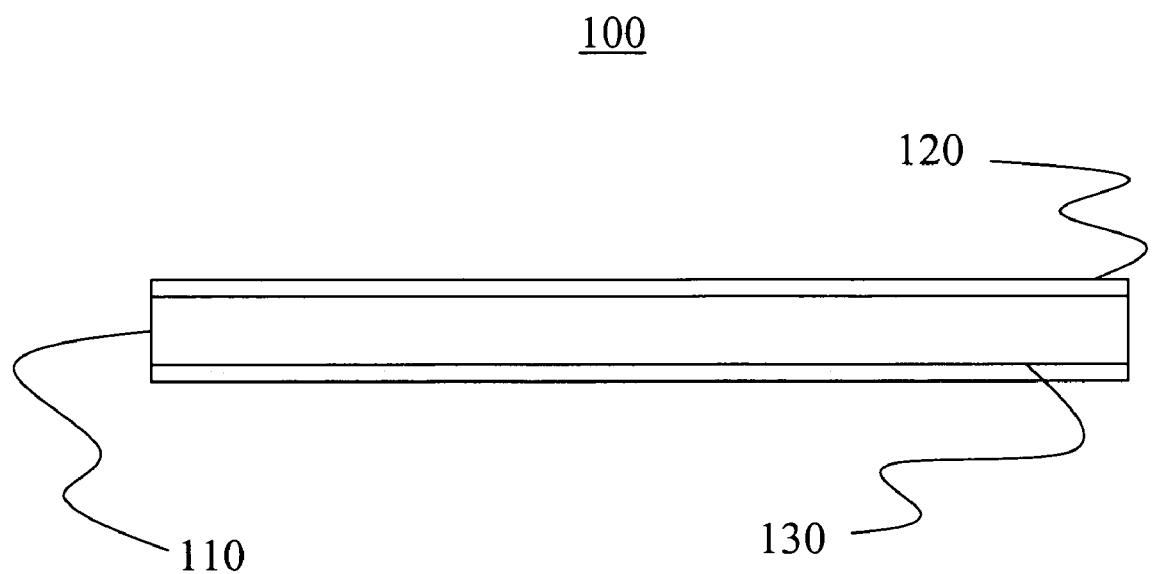
FIG. 1 is a schematic cross-sectional representation of a membrane electrode assembly of the present invention.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

The present invention provides a method of making a catalytic material for use as a cathode catalyst and a membrane electrode assembly (also referred to herein as "MEA") containing such a cathode catalyst. In addition, the invention provides a cathode catalyst made by the method described herein. The cathode catalyst comprises a metal support that includes at least one transition metal and at least one chalcogen, both in elemental form. The catalyst is intended for use as a cathode electrocatalyst in fuel cells, including polymer electrolyte fuel cells (also referred to herein as "PEFCs"), hydrogen-oxygen fuel cells, hydrogen-air fuel cells, and direct methanol fuel cells (also referred to herein as "DMFCs"). The invention also provides an MEA for such fuel cells, wherein the MEA includes a cathode catalyst made according to the method described herein.

Referring to the drawings in general and to FIG. 1 in particular, it will be understood that the illustrations are for the purpose of describing a particular embodiment of the invention and are not intended to limit the invention thereto. FIG. 1 is a schematic cross-sectional representation of an MEA of the present invention. MEA 100 comprises an ionomeric membrane 110, a cathode catalyst composite 120 disposed on a first surface of ionomeric membrane 110, and an anode catalyst 130 disposed on a second surface of ionomeric membrane 110.

In one embodiment, ionomeric membrane 110 is a poly (perfluorosulphonic acid) membrane which is commercially available as Nafion®, Aciplex®, or Flemion®. Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly[(3-methylphenooxy) (phenoxy) phosphazene] and poly[bis (3-methylphenoxy) phosphazene]; derivatives thereof; and combinations thereof may also be used. Anode catalyst 130 comprises at least one metal. The at least one metal is selected from those metals, such as, but not limited to, platinum, ruthenium, palladium, and combinations thereof, that are known and used in the art as fuel cell anode materials. Anode catalyst 130 is typically deposited on ionomeric membrane 110 by preparing an ink containing the at least one metal and applying the ink to a first surface of ionomeric membrane 110. In one embodiment, anode catalyst 130 comprises a mixture of platinum and ruthenium, such as, for example, platinum-ruthenium black.

Figure 2:
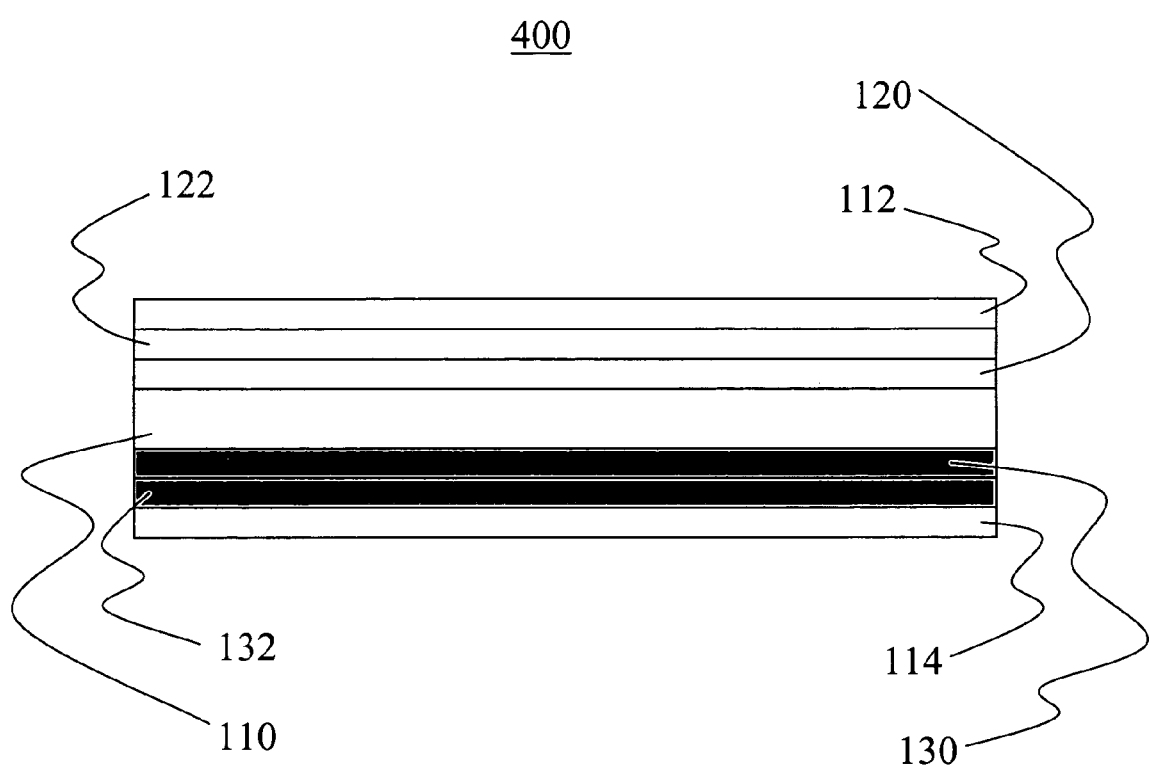
FIG. 2 is a schematic cross-sectional representation of a second embodiment of the membrane electrode assembly.

In another embodiment, shown in FIG. 2, a portion 132 of anode catalyst is additionally deposited on a surface of a first gas diffusion layer or "backing" 114 facing anode catalyst 130, disposed on ionomeric membrane 110. Alternatively, all of the anode catalyst may be deposited on first gas diffusion layer 114. First gas diffusion layer 114 is then joined to membrane electrode assembly 400 by placing the portion 132 of anode catalyst in contact with anode catalyst 130, which has been deposited on the first surface of ionomeric membrane 110, by, for example, compression or hot-pressing. Similarly, a portion 122 of cathode catalyst may be deposited on a surface of a second gas diffusion layer 112 facing cathode catalyst 120, disposed on ionomeric membrane 110. Second gas diffusion layer 112 is then joined to membrane electrode assembly 400 by placing the portion 122 of cathode catalyst in contact with cathode catalyst 120, which has been deposited on the first surface of ionomeric membrane 110, by, for example, compression or hot-pressing. As with the anode catalyst, all of the cathode catalyst may, in one embodiment, be applied to second gas diffusion layer 112. First and second gas diffusion layers 112, 114 may comprise carbon cloth, carbon paper, or other such materials that are known in the art.

Cathode catalyst 120 includes a support that comprises at least one transition metal in elemental form capable of reducing oxygen, at least one chalcogen in solid elemental form, and a recast ionomer. The at least one transition metal is present in the form of nanoparticles and is selected from the group consisting of ruthenium, osmium, rhenium, rhodium, platinum, palladium, cobalt, nickel, chromium, molybdenum, iron, manganese, vanadium, tungsten, and combinations thereof. The at least one chalcogen is disposed on at least a portion of a surface of the support, and is selected from the group consisting of sulfur, selenium, and tellurium. In one embodiment, the at least one chalcogen forms between about 0.1 monolayer and about 2 monolayers on the surface of the support. The at least one chalcogen serves to modify the surface of the at least one transition metal, thereby suppressing the oxidation of the at least one transition metal. The recast ionomer assures ionic conductivity within the catalyst, and is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, and combinations thereof. In a preferred embodiment, the recast ionomer is poly(perflourosulphonic acid).

Figure 6:
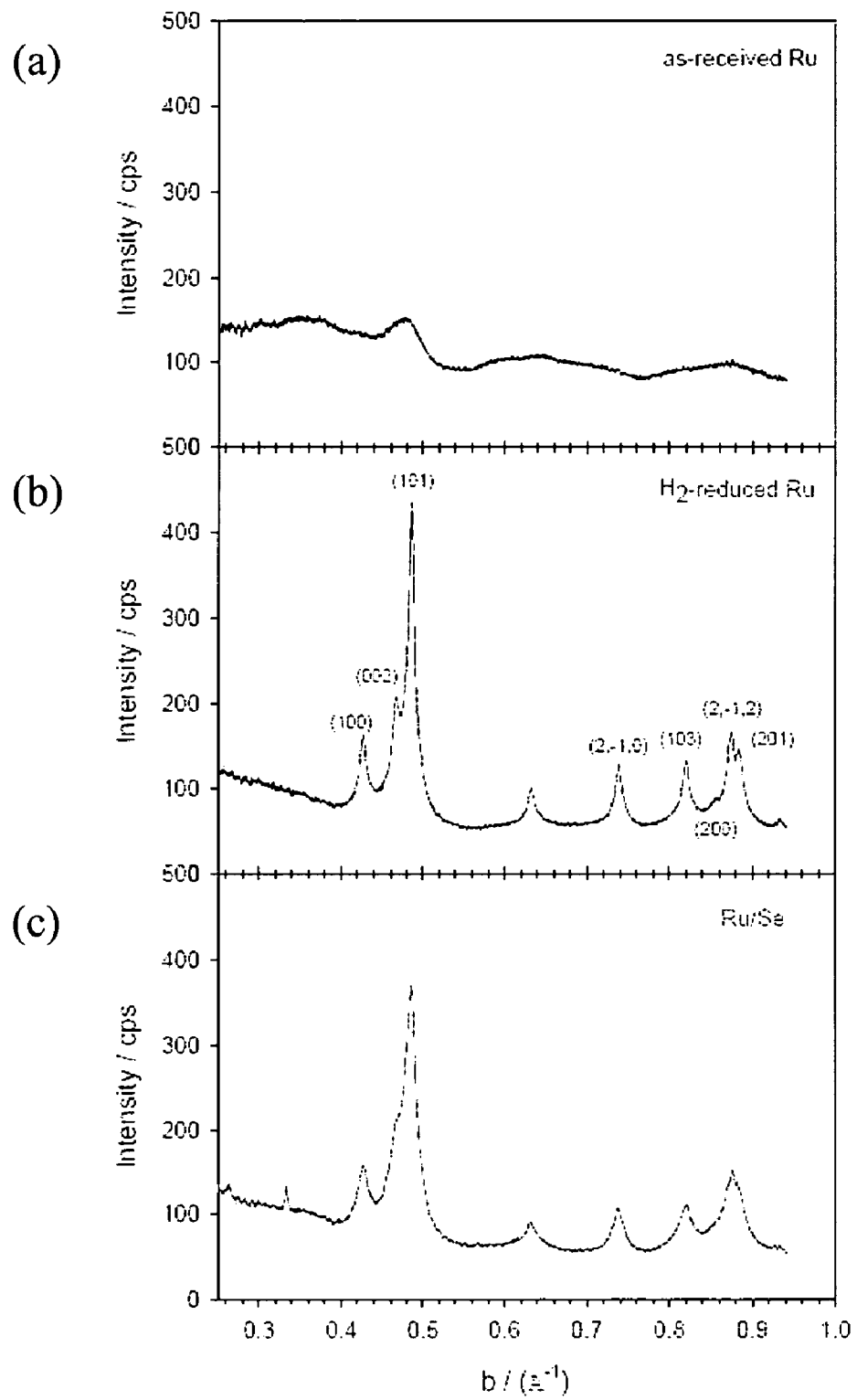
FIG. 6 includes x-ray diffraction data for: a) as received elemental ruthenium powder; b) elemental ruthenium powder after reduction in hydrogen; and c) elemental ruthenium powder after refluxing with selenium in xylene.

Cathode catalyst 120 of the present invention differs from known nano-cluster compounds such as $Mo_xRu_ySe_z$, and $Ru_xSe_y$. Such nano-cluster compounds comprise a metal atom core or "center" around which chalcogen atoms are coordinated so as to form a chemical compound, thereby stabilizing the metal atom center. In contrast to such nano-cluster compounds, cathode catalyst 120 comprises a "support" of a transition metal in elemental form, the surface of which is modified by the chalcogen. While some compound formation may occur at the surface of the transition metal, no chemical compound is formed between the chalcogen and the bulk of the transition metal. X-ray diffraction (XRD) data obtained for the Ru/Se particles at different stages of preparation, shown in FIG. 6, demonstrates that ruthenium and selenium do not combine in the bulk to form a discrete compound. As-received ruthenium black (FIG. 6(a)) comprises ruthenium oxides and a small amount of metallic ruthenium. Elemental ruthenium is recovered by reducing the oxidized sample in hydrogen (FIG. 6(b)). The XRD pattern obtained after refluxing the ruthenium powder with selenium in xylene is shown in FIG. 6(c). Aside from changes in peak intensity and peak widths, the basic diffraction pattern seen in FIG. 6(c) remains is the same as that shown in FIG. 6(b), indicating that the bulk ruthenium remains in elemental form after refluxing with selenium.

Figure 3:
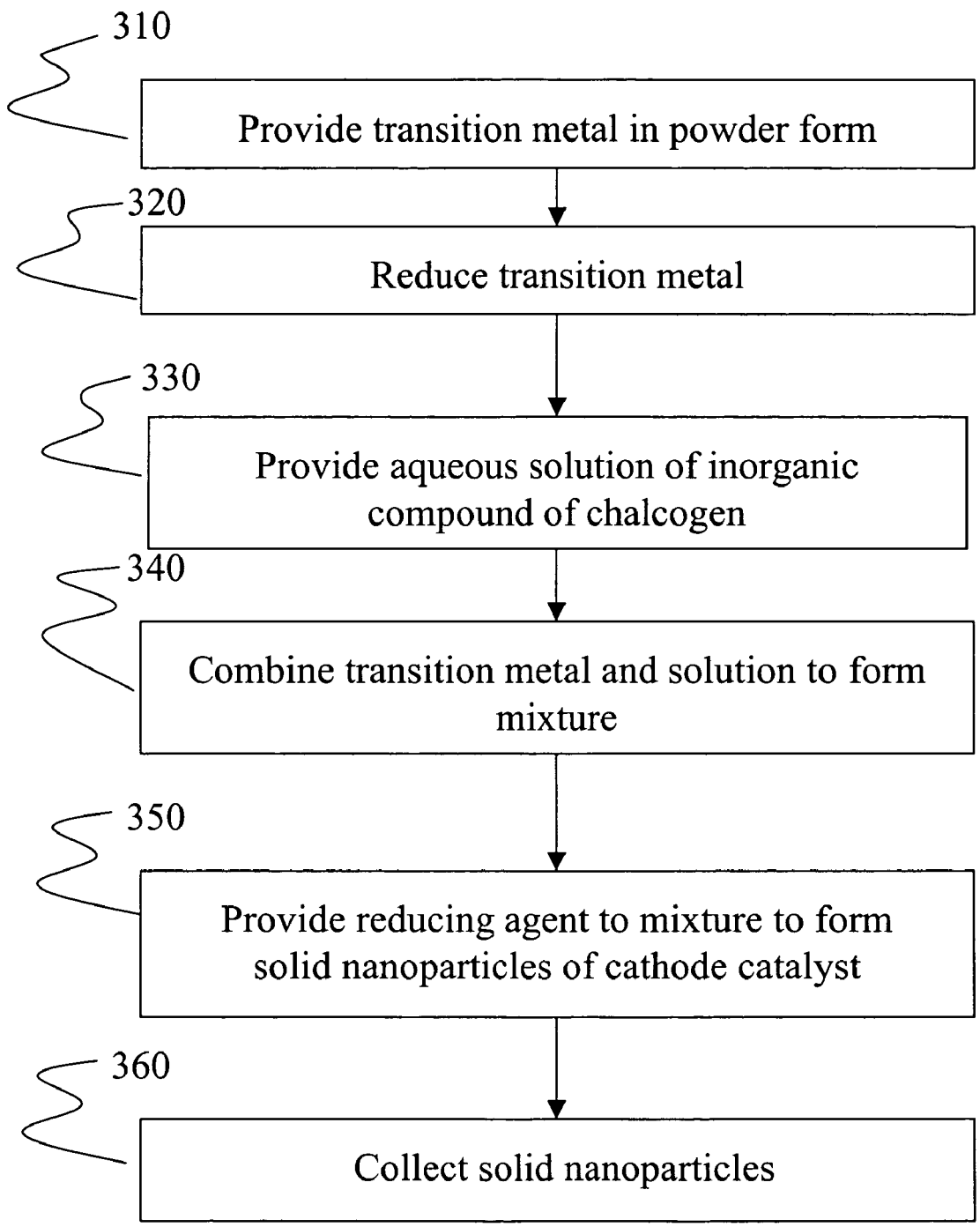
FIG. 3 is a flow chart for a method of making a cathode catalyst.

The invention also provides a method of making a cathode catalyst material that is used in both the membrane electrode assembly 100 and cathode catalyst 120 described hereinabove. The material includes a support that comprises at least one transition metal in elemental form and at least one chalcogen in solid elemental form disposed on the support, as described hereinabove. The method 300 is outlined in the flow chart shown in FIG. 3. In Step 310, the at least one transition metal is provided in powder form. In one embodiment, the transition metal is selected from the group consisting of ruthenium, osmium, rhenium, rhodium, platinum, palladium, cobalt, nickel, chromium, molybdenum, iron, manganese, vanadium, tungsten, and combinations thereof. In one non-limiting example, ruthenium black may be provided. In one embodiment, the powder comprises nanoparticles having an average particle size of up to about 15 nm. In a particular embodiment, the powder has an average particle size in a range from about 10 nm to about 15 nm. Oxide is removed from the transition metal powder by heating the metal powder in a hydrogen-containing atmosphere (Step 320). Ultra high purity (UHP) hydrogen is typically used in the reduction of the transition metal. In one example, Step 320 is conducted using flowing hydrogen with reduction of the transition metal being allowed to proceed at about 100° C. for about four hours.

An aqueous solution containing at least one inorganic compound of the at least one chalcogen is provided in Step 330. The concentration of the at least one inorganic compound in the aqueous solution is in a range from about 0.001 M to about 0.05 M. The chalcogen is selected from the group consisting of selenium, sulfur, and tellurium. The at least one inorganic compound is water soluble and includes at least one of a halide, a sulfide (where the chalcogen is selenium or tellurium), and an oxide of a chalcogen, as well as combinations thereof. In one embodiment, the inorganic compound is an oxide of the chalcogen, such as, for example, selenium (IV) oxide. The inorganic compound may, however, contain the chalcogen in the (I) and (II) valence states as well. The reduced transition metal and the solution are combined in Step 340 to yield a mixture. A reducing agent is then provided to the mixture to reduce the chalcogen and form solid nanoparticles of the cathode catalyst material (Step 350). The reducing agent may be one of hydrazine, a metal hydride such as, for example, sodium borohydride, and hydrogen gas. In one embodiment, argon is bubbled through the solution for a predetermined time period prior to combining the solution with the reduced transition metal and, once combined, the mixture comprising the reduced transition metal and solution are stirred or agitated at room temperature as a hydrogen is slowly bubbled through the mixture to reduce the chalcogen and form solid nanoparticles of the cathode catalyst material. Hydrogen is typically bubbled through the mixture for a predetermined time. In one example, hydrogen is bubbled through the mixture for about four hours. Step 350 is carried out in a temperature range from about 10° C. to about 40° C. In one embodiment, Step 350 is carried out at room temperature (i.e., 20-25° C.).

The solid nanoparticles are then separated from the mixture, collected (Step 360), and dried. In one embodiment, vacuum filtration is used to separate and collect the solid nanoparticles of cathode catalyst materials. Other means of separating the solid nanoparticles from the mixture include, but are not limited to, centrifugation, evaporation of the solvent, and the like. Following collection, the solid nanoparticles are typically washed with water repeatedly and dried at room temperature in air. The solid nanoparticles may then be combined with a recast ionomer, such as those described hereinabove, to form a cathode catalyst ink for application to ionomeric membrane 110.

Figure 4:
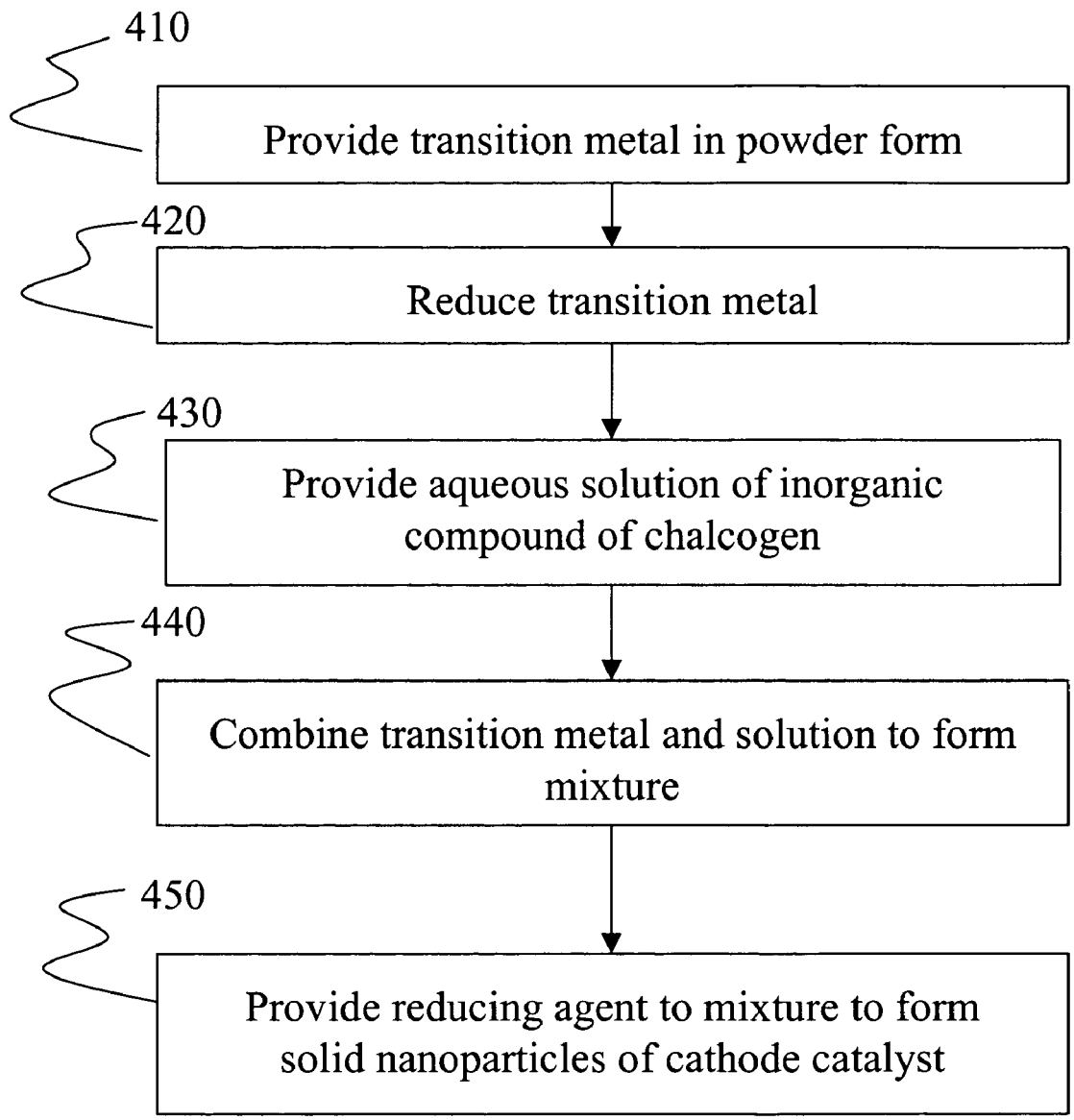
FIG. 4 is a flow chart for a method of making a catalyst material.

A method of making a catalytic material comprising at least one transition metal and at least one chalcogen disposed on at least a portion of the transition metal is also provided by the invention. A flow chart outlining method 400 is shown in FIG. 4. In Step 410, at least one transition metal, previously described hereinabove, is provided in powder form. The transition metal is reduced (Step 420) by heating to a predetermined temperature under hydrogen as previously described. In Step 430, an aqueous solution containing at least one inorganic compound of the at least one chalcogen is provided, and a mixture is formed by combining the transition metal powder and the solution (Step 440). A reducing agent is then provided to the mixture (Step 450) at room temperature to form solid nanoparticles of the catalytic material. The details of Steps 420-450 are identical to those previously described for Steps 320-350 of method 300.

Figure 5:
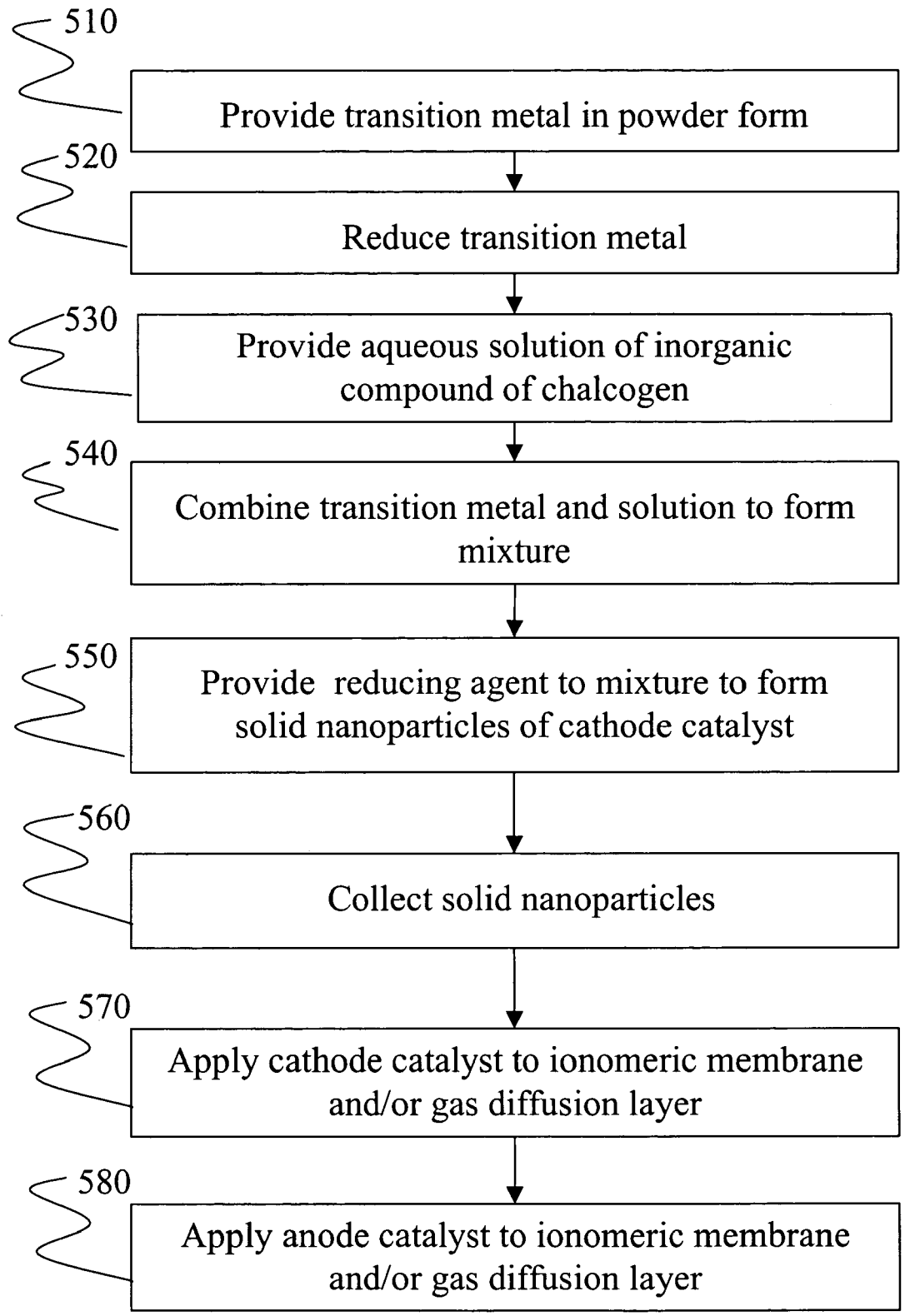
FIG. 5 is a flow chart for a method of making a membrane electrode assembly.

A method, outlined in the flow chart shown in FIG. 5, of making membrane electrode assembly 100 comprising cathode catalyst 120, both of which have been previously described herein, is also provided. In step 510, the at least one transition metal is provided in elemental form as a powder. In one non-limiting example, ruthenium black is provided. In one embodiment, the powder comprises nanoparticles having an average particle size of up to about 15 nm. In a particular embodiment, the powder has an average particle size in a range from about 10 to about 15 nm. Oxide is removed from the transition metal in elemental form powder by heating the metal powder in a hydrogen-containing atmosphere (Step 520). An aqueous solution containing at least one inorganic compound comprising the at least one chalcogen of the at least one chalcogen is provided in Step 530. The transition metal and the solution are combined (Step 540) to form a mixture. A reducing agent is then added to the mixture to form solid nanoparticles of the cathode catalyst (Step 550). Cathode catalyst 120, comprising the solid nanoparticles, is then collected (Step 560) and dried. The details of Steps 510-560 are identical to those described for Steps 310-360 of method 300, presented hereinabove. The solid nanoparticles of cathode catalyst 120 may then be combined with a recast ionomer, such as those described hereinabove, to form a cathode catalyst ink for application to ionomeric membrane 110. The anode catalyst is combined separately with recast ionomer to form an anode catalyst ink, as previously described. The cathode catalyst ink containing cathode catalyst 120 is then applied to a surface of ionomeric membrane 110 in Step 570, and the anode catalyst ink containing anode catalyst 130 is applied to another surface of ionomeric membrane 110 in Step 580 to form MEA 100. In another embodiment, a portion of the anode catalyst ink is also applied to a surface of a first gas diffusion layer 114, and the first gas diffusion layer 114 is then placed in contact with a portion of anode catalyst ink that has been deposited on the first surface of ionomeric membrane 110. Similarly, a portion of the cathode catalyst ink may be applied to a surface of a second gas diffusion layer 112, which in turn contacts a portion of cathode catalyst ink that has been applied the second surface of ionomeric membrane 110. The anode catalyst and cathode catalyst inks may be applied to ionomeric membrane 110 or, alternatively, to gas diffusion layers 112, 114, using techniques such as, but not limited to, brush painting, doctor-blading, ultrasonic spraying, air spraying, screen-printing, decal transfer, and the like.

Methods 300, 400, and 500 provide catalysts having exceptionally high activity. The catalysts exhibit exceptional selectivity for the oxygen reduction reaction (ORR) in the presence of methanol. By using aqueous solutions of inorganic compounds, such as oxides, sulfides and halides of the chalcogens, the methods described herein also eliminate the use of organic solvents, such as xylenes, and other potentially toxic substances, such as elemental selenium. Whereas known aqueous routes to the formation of metal chalcogenides require dissolution and precipitation of a metal, introduction of the chalcogen in elemental form and heating, methods 300, 400, and 500 utilize commercially available metal powders and chalcogen compounds to synthesize the catalyst material at room temperature. The methods described herein therefore provide advantages such as low production cost, environmental friendliness, and suitability for production of large quantities. Because of its high methanol tolerance, the cathode catalyst prepared by these methods is capable of operating in highly concentrated methanol solutions. The MEA 100 and cathode catalyst 120 prepared by the present methods outperform platinum-based cathode catalysts even at moderate methanol concentrations in the anode feed stream in both separated flow and mixed reactant flow fuel cells.

The following examples are intended to illustrate the features and advantages of the invention and are in no way intended to limit the invention thereto.

EXAMPLE 1

Preparation of Ru/Se Catalysts 150 mg of commercial ruthenium black (Alfa Aesar, 99.9%) was reduced at 100° C. under flowing ultra high purity (UHP) hydrogen for 4 hours. An aqueous solution of $SeO_2$ was prepared by dissolving 56 mg $SeO_2$ into 50 mL of deionized water. The solution was bubbled with UHP argon for 40 minutes, and then introduced into the flask containing the hydrogen-reduced Ru black under Ar protection. The mixture of Ru black and $SeO_2$ solution was then stirred under slow $H_2$ bubbling for 1.5 hours at room temperature. The resulting Ru/Se nanoparticles were separated from the mixture by vacuum filtration using 0.22 mm filter paper and washed six times with deionized water. The solid particles were then dried at room temperature in air for 12 hours.

For comparison, a Ru/Se catalyst sample was also prepared using the method described in U.S. Pat. No. 7,588,857, entitled "Chalcogen Catalysts for Polymer Electrolyte Fuel Cell," filed on Dec. 5, 2005, by Piotr Zelenay et al. As-received ruthenium black was reduced at 230±10° C. for 1 hour under UHP hydrogen flow. The reduced Ru black was then cooled to room temperature in hydrogen, which was then replaced by UHP argon. As-received selenium powder (Alfa Aesar, ~200 mesh) and xylene (Fisher Scientific ACS; dried for one week using molecular sieves) were used to prepare a suspension. The suspension of selenium powder in xylene (pre-purged with argon for 30 minutes) was then injected into a flask containing the reduced Ru black. The mixture was heated up to the solvent boiling point (~140° C.) under reflux for 24 hours with argon slowly flowing through the suspension. After the reaction took place, the solid particles were separated from the solvent by centrifuging and then washed six times with anhydrous ethyl ether (Fisher Scientific, certified ACS) before being finally dried under vacuum for 2 hours.

EXAMPLE 2

Reactivity Test of Ru/Se Catalysts

Figure 7:
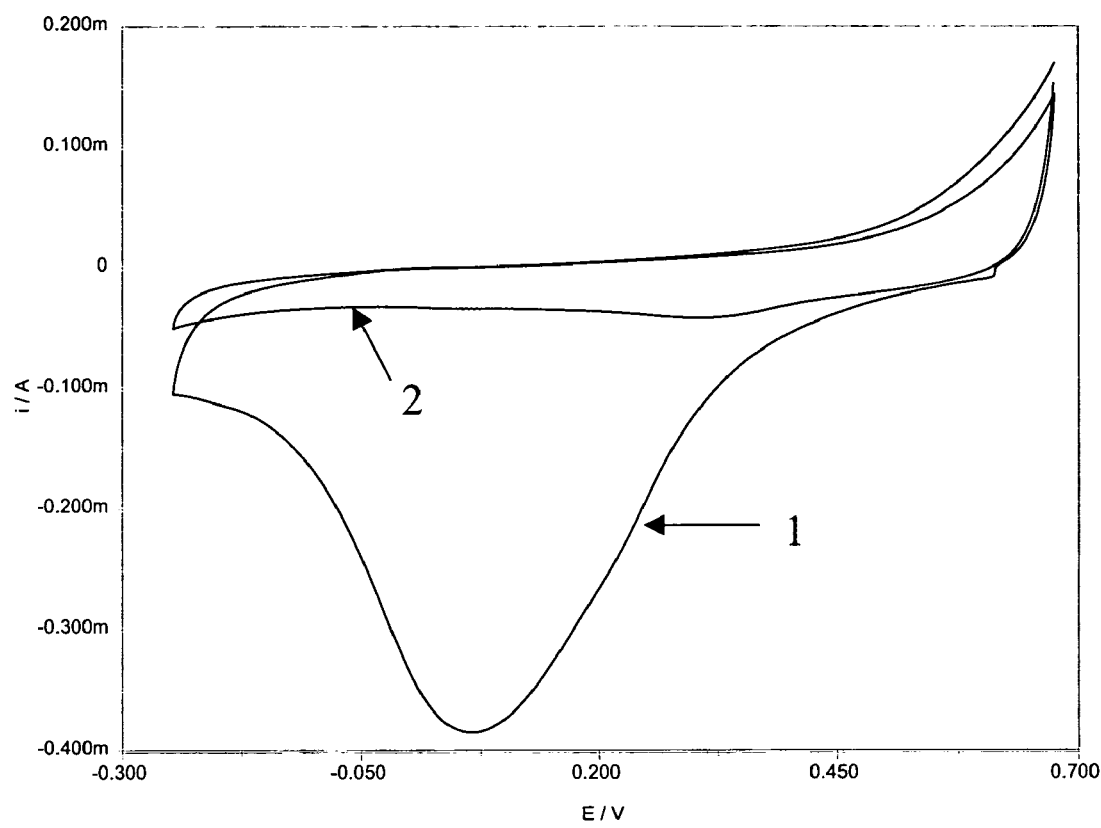
FIG. 7 is a plot of current-potential curves for a Ru/Se catalyst prepared according to the method of the invention, obtained in 0.1 M $H_2SO_4$ and a scan speed of 20 mV/s.
Figure 8:
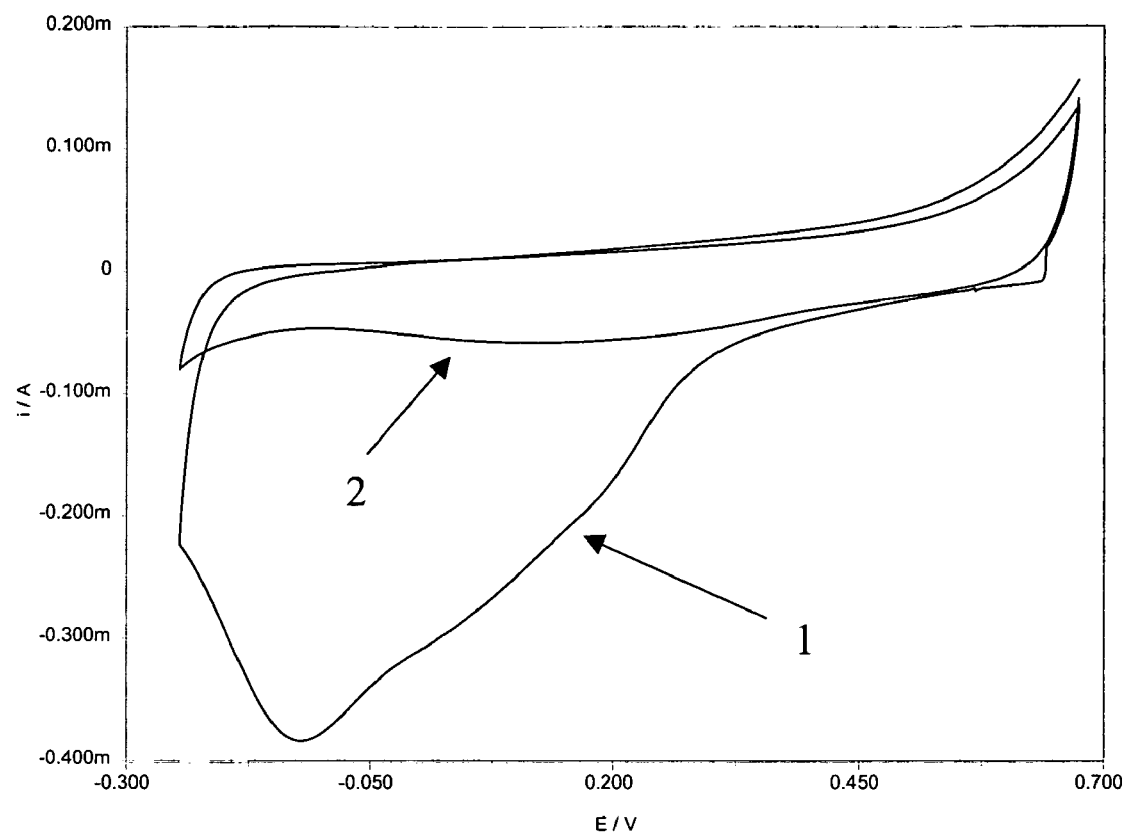
FIG. 8 is a plot of current-potential curves for a Ru/Se catalyst prepared from a selenium suspension in xylene, obtained in 0.1 M $H_2SO_4$ and a scan speed of 20 mV/s.

The Ru/Se catalyst nanoparticles prepared according to the methods described in Example 1 were deposited separately on a gold rotating disc electrode (RDE). The RDE was 3 mm in diameter and the catalyst loading about 150 μg/cm$^2$. The loaded RDE was subjected to 3-5 cycles of potential scanning, at a scan speed of 20 mV/s between about 0.03 V and about 0.95 V, vs. a reversible hydrogen electrode (RHE). The potential cycling starts from an open circuit potential, going in the negative direction to 0.03V. FIG. 7 shows the current-potential curves (first scan (curve 1), and second scan (curve 2)) obtained in 0.1 M $H_2SO_4$ solution for the catalyst prepared according to the present method (i.e., from $SeO_2$ in aqueous solution). The Ru/Se catalysts were activated during the potential cycling by removing surface oxide species. FIG. 8 displays the current-potential curves (first scan (curve 1), and second scan (curve 2)) of Ru/Se prepared using the selenium suspension in xylenes. The cyclic voltammograms of the two Ru/Se samples prepared using different methods are about the same; both show a large cathodic peak in the first scan that corresponds to reduction of surface oxide species.

Figure 9:
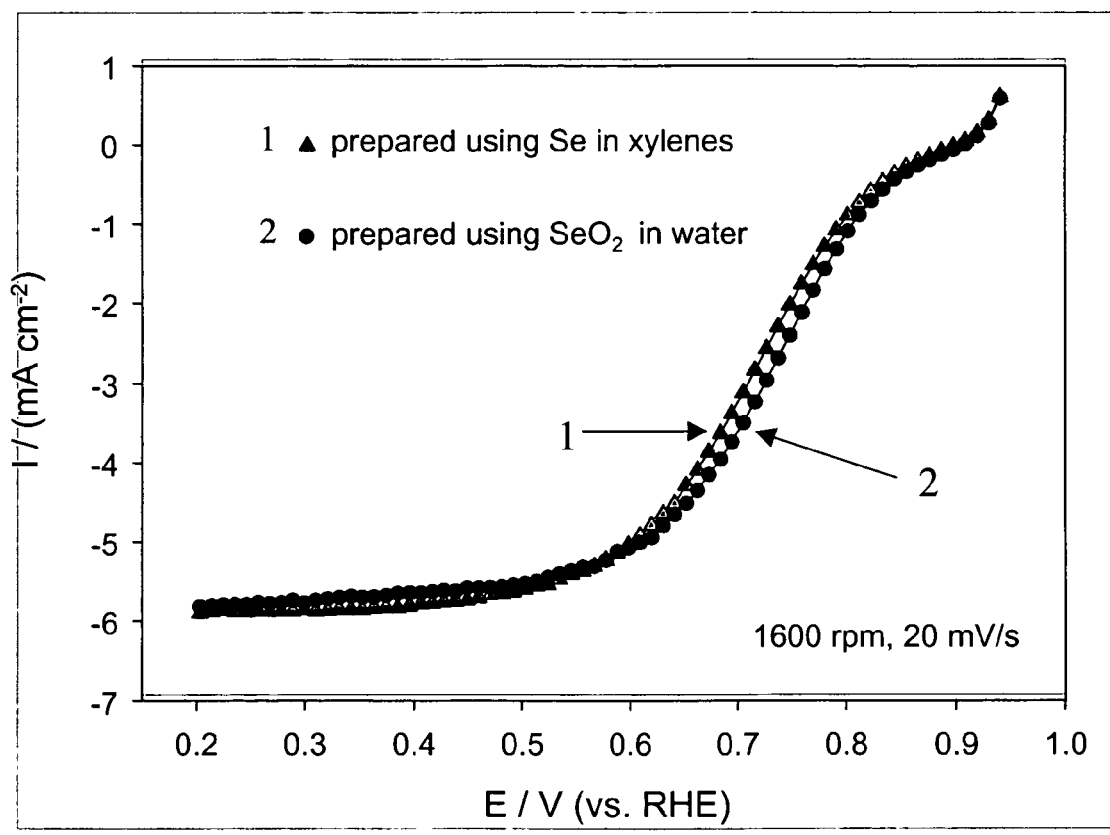
FIG. 9 is a plot of current density-potential curves obtained for 1) a Ru/Se catalyst prepared using a selenium suspension in xylene; and 2) a Ru/Se catalyst prepared according to the method of the invention, carried out in O2-saturated 0.1 M $H_2SO_4$ at 1600 rpm and 20 mV/s scan speed at ambient temperature.

The oxygen reduction reaction (ORR) was carried out on the activated Ru/Se nanoparticles prepared from $SeO_2$ in aqueous solution and on activated Ru/Se nanoparticles prepared from the selenium suspension in xylenes. Based on the results obtained, shown in FIG. 9, the two samples display similar ORR activity.

EXAMPLE 3

Preparation of Cathode Catalyst Electrodes

Cathode catalyst inks were prepared by thoroughly blending the Ru/Se composite powders prepared in Example 1 with water and recast Nafion® ionomer. The required amount of cathode catalyst powder was combined with de-ionized water to achieve a 1:10 ratio by weight. An appropriate quantity of 5% Nafion® solution (1100 equivalent weight, Solution Technology, Inc.) needed to obtain a 1:1 volume ratio of the catalyst to Nafion® in the cathode catalyst layer 120 was added to the water-wetted catalyst. The solution was placed in an ice bath to prevent overheating and minimize evaporation of solvents and ultrasonically mixed for 90 seconds.

EXAMPLE 4

Preparation of Anode Catalyst Electrode

The procedure for making anode catalyst ink was similar to that used for the cathode catalyst inks. The anode catalyst was a Pt/Ru black powder (Johnson Matthey). The Pt/Ru catalyst was combined with de-ionized water to obtain a 1:10 ratio by weight. An appropriate quantity of 5% Nafion® solution (1100 equivalent weight, Solution Technology, Inc.) was added to the water-wetted catalyst to obtain a 1:1 volume ratio of the catalyst to Nafion® in the anode catalyst layer 130. The solution was placed in an ice bath to prevent overheating and minimize evaporation of solvents and ultrasonically mixed for 90 seconds.

EXAMPLE 5

Preparation of Membrane Electrode Assemblies

The anode catalyst and cathode catalyst inks prepared in Examples 3 and 4 were applied to ionomeric membranes using brush painting. Other application methods, such as, but not limited to, doctor-blading, ultrasonic spraying, air spraying, decal transfer, screen-printing, and the like may also be used. While the ionomeric membrane Nafion® 117 was used in this example, other membranes and gas diffusion media may be used as well. A piece of an ionomeric membrane was placed on the top of a vacuum table that had been preheated to 75° C. The vacuum table was used to hold the membrane in place and avoid wrinkling while painting. Either of the anode ink or cathode ink was then applied to one side of the membrane using a camel hair brush. After the painting of the first electrode had been completed, the membrane was turned over and the electrode was painted on the other side. The vials containing the anode and cathode inks were cooled in an ice bath during painting and capped whenever possible to minimize evaporation of solvents. Upon completion of painting, the MEA was left on the heated vacuum table for an additional 30 minutes to allow the anode and cathode catalyst layers to cure. The MEA was then removed from the table and placed in a sealed plastic bag for future use. The anode and cathode catalyst loadings were approximately 8.0 mg/cm$^2$ Pt—Ru and 5.0 mg/cm$^2$ Ru/Se, respectively.

Each MEA was then assembled in standard 5 cm$^2$ fuel cell hardware. Hydrophobic double-sided and single-sided carbon-cloth gas diffusion layers (backings) from De Nora USA (E-TEK, Inc.) were used on the cathode and the anode sides of each fuel cell, respectively.

EXAMPLE 6

Hydrogen-Air Fuel Cell Performance

The performance of the MEAs and cathode catalysts described in the preceding examples was tested in hydrogen-air fuel cells. Performance was tested at 30° C., 50° C., 70° C., and 80° C. The flow rates of hydrogen and air were 300 sccm and 466 sccm, respectively. The anode and cathode back-pressures were 30 psig. The gases were humidified at a temperature that was 10° C. greater than the cell operating temperature.

Figure 10:
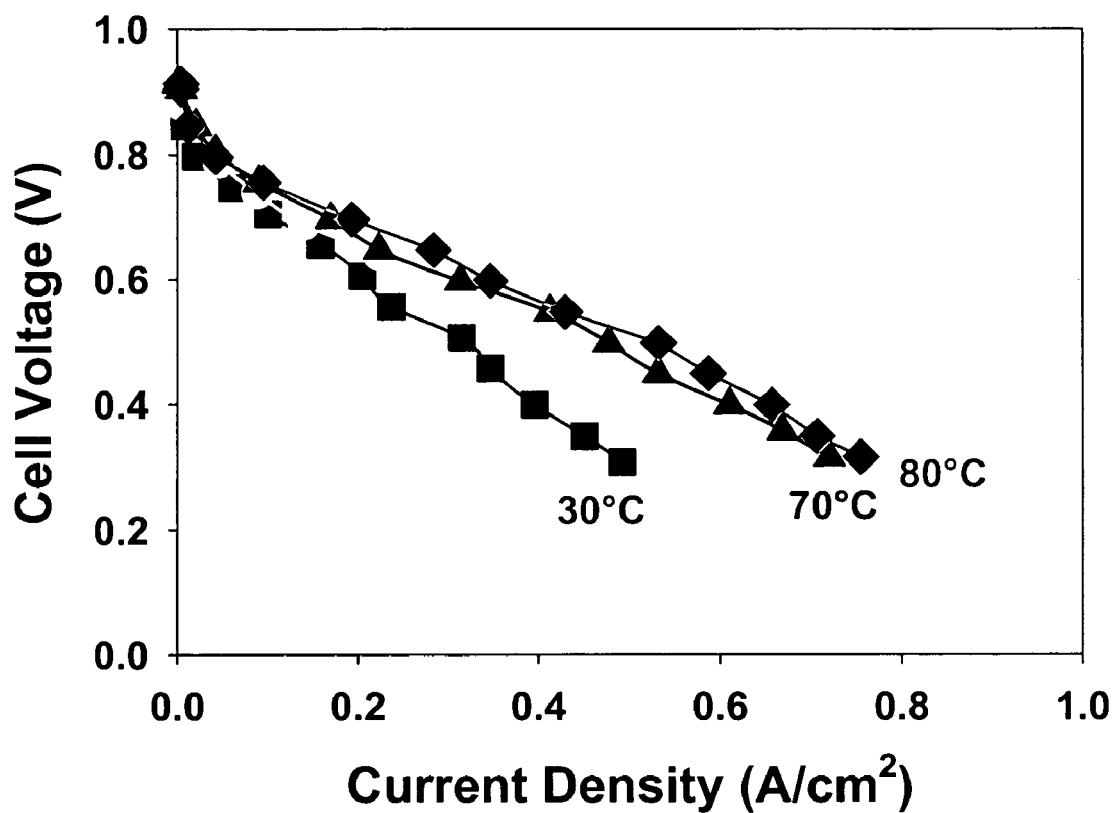
FIG. 10 is a plot of hydrogen-air fuel cell polarization plots obtained at cell temperatures of 30° C., 50° C., 70° C., and 80° C. for a membrane electrode assembly (MEA) having a Ru/Se cathode catalyst prepared according to the invention.

Hydrogen-air polarization plots obtained at different temperatures of the MEA having a new Ru/Se cathode prepared according to the method of the present invention using $SeO_2$ in water are shown in FIG. 10. The polarization plots show improving cell performance with increasing cell temperature. For example, at 0.40 V, current densities of 396 mA/cm$^2$, 530 mA/cm$^2$, 610 mA/cm$^2$, and 657 mA/cm$^2$ were measured at 30° C., 50° C., 70° C., and 80° C., respectively. In addition, FIG. 10 also shows that the maximum current density of 657 mA/cm$^2$ obtained for the Ru/Se cathode is about 60% of that (1100 mA/cm$^2$) achieved by cells having Pt cathodes, thus demonstrating the high catalytic activity of the chalcogen catalyst of the present invention in hydrogen-air fuel cells.

EXAMPLE 7

Direct Methanol Fuel Cell Performance

In DMFC testing, methanol was supplied to the anode at a rate of 1.8 mL/min. Air, humidified at 90° C., was provided to the cathode at ambient pressure (unlike the hydrogen-oxygen experiments previously described above). Methanol was provided at concentrations of 0.5 M, 2.0 M, 5.0 M, 12 M, and 17 M. The DMFC was tested at 80° C.

Figure 11:
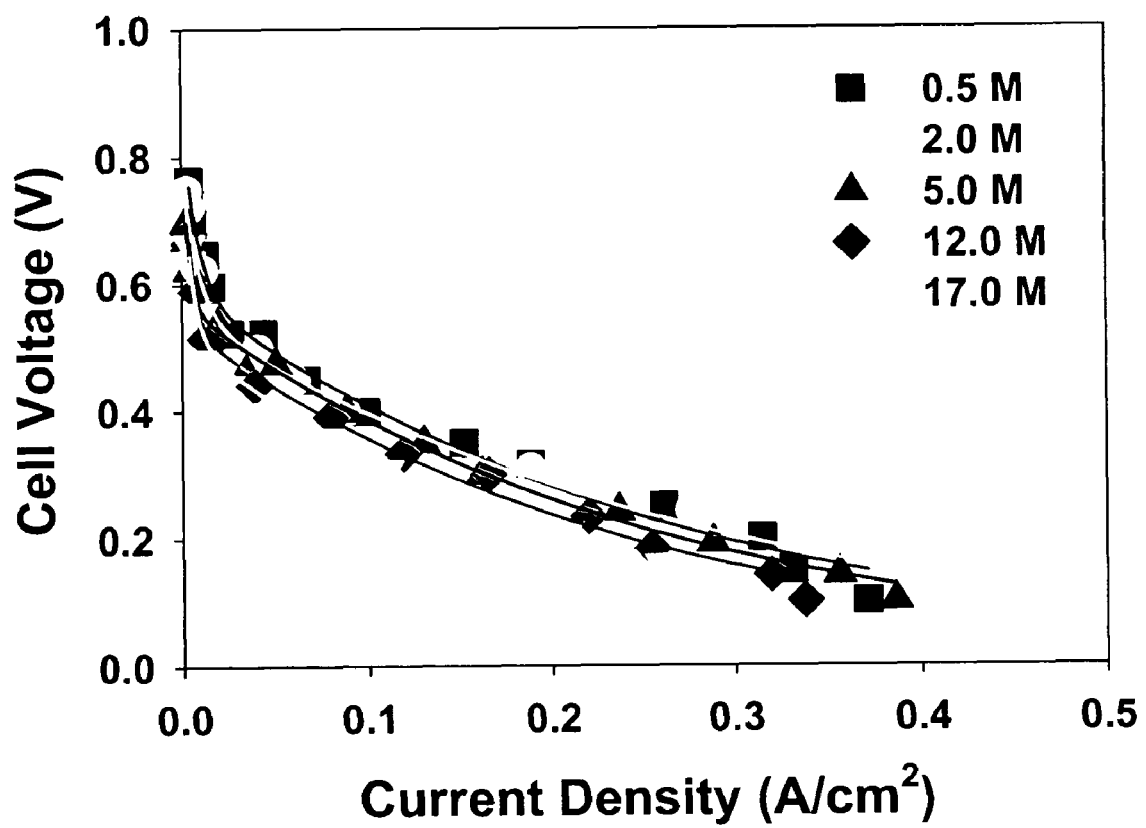
FIG. 11 is a plot of direct methanol fuel cell (DMFC) polarization plots at 80° C. obtained with anode methanol concentrations of 0.5 M, 2.0 M, 5.0 M, 12 M, and 17 M.

Using the Ru/Se cathodes prepared using the method of the present invention, DMFC polarization plots were obtained at 80° for different anode methanol concentrations. The results are shown in FIG. 11. DMFC power densities observed using the catalyst of the present invention are 65 mW/cm$^2$, 67 mW/cm$^2$, 57 mW/cm$^2$, 51 mW/cm$^2$, and 43 mW/cm$^2$ at 0.5 M, 2.0 M, 5.0 M, 12 M, and 17 M methanol, respectively. The virtual independence of the Ru/Se cell performance shown in FIG. 11 exceeds that of platinum fuel cells at higher methanol concentrations. The decreased fuel cell performance observed for the 17 M methanol concentration is due to lower anode catalyst activity, rather than to the loss of methanol tolerance of the Ru/Se catalyst.

Figure 12:
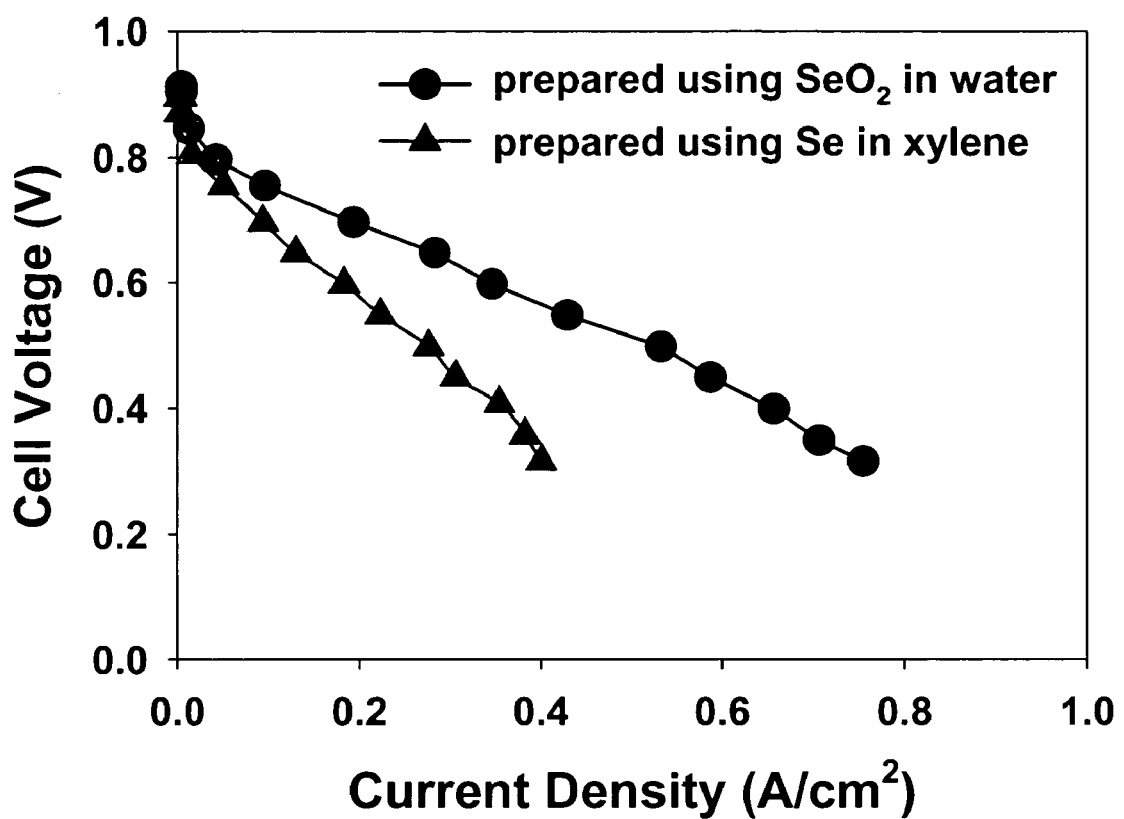
FIG. 12 is a plot of hydrogen-air fuel cell polarization plots of the MEAs at 80° C. using a Ru/Se cathode catalyst prepared according to the invention and a Ru/Se cathode catalyst prepared from a selenium suspension in xylene.

The performance of the Ru/Se catalyst prepared from $SeO_2$ solution in accordance with the present invention was compared to that of a Ru/Se catalyst prepared in xylenes, as described in Example 1. The performance of the two catalysts is compared in FIG. 12. At 0.40 V in the hydrogen-air operating mode at 80° C., the current density generated using the Ru/Se catalysts prepared by the method of the present invention using $SeO_2$ in water is 657 mA/cm$^2$, whereas the current density of the Ru/Se catalyst prepared by the method using Se in xylene is 355 mA/cm$_2$. With 0.5 M methanol at 80° C., the maximum DMFC power density is 65 mW/cm$^2$ for the Ru/Se catalyst of the present invention, whereas the Ru/Se catalyst prepared using Se in xylene is 35 mW/cm$^2$. Thus, the Ru/Se catalyst prepared by the method of the present invention exhibits much better performance than the Ru/Se catalyst prepared using xylene and elemental selenium, in both the hydrogen-air and DMFC modes of operation.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of making a cathode catalyst, the cathode catalyst comprising a support, the support comprising at least one transition metal in elemental form, and at least one chalcogen in elemental form disposed on at least a portion of a surface of the support, the method comprising the steps of:
   a. providing a powder comprising the at least one transition metal or comprising a mixture of the at least one transition metal and oxides of the at least one transition metal;
   b. reducing the oxides of the at least one transition metal;
   c. providing an aqueous solution comprising at least one inorganic compound comprising the at least one chalcogen;
   d. combining the at least one transition metal or the mixture of the at least one transition metal and the reduced oxides of the at least one transition metal with the aqueous solution to form a mixture;
   e. providing a reducing agent to the mixture of step d to reduce the at least one chalcogen to form solid nanoparticles of the cathode catalyst, the solid nanoparticles comprising the at least one transition metal and the at least one chalcogen in elemental form; and
   f. collecting the solid nanoparticles.

2. The method according to claim 1, wherein the cathode catalyst forms a portion of a membrane electrode assembly.

3. The method according to claim 1, wherein the at least one transition metal is selected from the group consisting of ruthenium, osmium, rhenium, rhodium, platinum, palladium, cobalt, nickel, chromium, molybdenum, iron, manganese, vanadium, tungsten, and combinations thereof.

4. The method according to claim 1, wherein the at least one chalcogen is selected from the group consisting of selenium, sulfur, and tellurium.

5. The method according to claim 4, wherein the at least one inorganic compound of the at least one chalcogen is selected from the group consisting of halides, sulfides, oxides, and combinations thereof.

6. The method according to claim 1, further comprising the step of blending the cathode catalyst solid particles with a recast ionomer.

7. The method according to claim 6, wherein the recast monomer is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, derivatives thereof, and combinations thereof.

8. The method according to claim 7, wherein the recast ionomer is poly(perflourosulphonic acid).

9. The method according to claim 1, wherein the concentration of the at least one inorganic compound in the aqueous solution is in a range from about 0.001 M to about 0.05 M.

10. The method according the claim 1, wherein the reducing agent is one of hydrazine, a metal hydride, and hydrogen gas.

11. The method according to claim 10, wherein the reducing agent is hydrogen gas.

12. The method according claim 11, wherein the step of providing the reducing agent to the mixture further comprises agitating the mixture while providing the hydrogen gas.

13. The method according to claim 1 wherein the step of reducing the at least one transition metal comprises reducing the at least one transition metal under flowing hydrogen gas at a predetermined temperature for a predetermined time.

14. The method according to claim 1, wherein the step of providing the reducing agent to the mixture further comprises maintaining the mixture at a temperature in a range from about 10° C. to about 30° C.

15. The method according to claim 1, wherein the step of collecting the solid nanoparticles of the cathode catalyst comprises at least one of vacuum filtering the mixture and solid nanoparticles to collect the solid nanoparticles, centrifugation, and evaporation.

16. A method of making a catalytic material, the cathode material comprising at least one transition metal in elemental form, and at least one chalcogen in elemental form disposed on at least a portion of a surface of the at least one transition metal, the method comprising the steps of
   a. providing a powder comprising the at least one transition metal or comprising a mixture of the at least one transition metal and oxides of the at least one transition metal;
   b. reducing the oxides of the at least one transition metal;
   c. providing an aqueous solution comprising at least one inorganic compound comprising the at least one chalcogen;
   d. combining the at least one transition metal or the mixture of the at least one transition metal and the reduced oxides of the at least one transition metal with the aqueous solution to form a mixture; and
   e. providing a reducing agent to the mixture of step d to reduce the at least one chalcogen to form solid nanoparticles of the cathode catalyst, the solid nanoparticles comprising the at least one transition metal and the at least one chalcogen in elemental form.

17. The method according to claim 16, wherein the at least one transition metal is selected from the group consisting of ruthenium, osmium, rhenium, rhodium, platinum, palladium, cobalt, nickel, chromium, molybdenum, iron, manganese, vanadium, tungsten, and combinations thereof.

18. The method according to claim 16, wherein the at least one chalcogen is selected from the group consisting of selenium, sulfur, and tellurium.

19. The method according to claim 18, wherein the at least one inorganic compound of the at least one chalcogen is selected from the group consisting of halides, sulfides, oxides, and combinations thereof.

20. The method according to claim 16, wherein the concentration of the at least one inorganic compound in the aqueous solution is in a range from about 0.001 M to about 0.05 M.

21. The method according the claim 16, wherein the reducing agent is one of hydrazine, a metal hydride, and hydrogen gas.

22. The method according to claim 21, wherein the reducing agent is hydrogen gas.

23. The method according claim 22, wherein the step of providing the reducing agent to the mixture further comprises agitating the mixture while providing the hydrogen gas.

24. The method according to claim 22, wherein the step of reducing the at least one transition metal comprises reducing the at least one transition metal under flowing hydrogen gas at a predetermined temperature for a predetermined time.

25. The method according to claim 16, wherein the step of providing the reducing agent to the mixture further comprises maintaining the mixture at a temperature in a range from about 10° C. to about 30° C.

26. A method of making a membrane electrode assembly, the membrane assembly comprising a ionomeric membrane, an anode catalyst disposed on a first surface of the ionomeric membrane, and a cathode catalyst disposed on a second surface of the ionomeric membrane, the cathode catalyst comprising a support comprising at least one transition metal in elemental form capable of reducing oxygen; and at least one chalcogen in elemental form disposed on at least a portion of a surface of the support, wherein the method comprises the steps of:

a. providing a powder comprising the at least one transition metal or comprising a mixture of the at least one transition metal and oxides of the at least one transition metal;

b. reducing the oxides of the at least one transition metal;

c. providing an aqueous solution comprising at least one inorganic compound comprising the at least one chalcogen;

d. combining the at least one transition metal or the mixture of the at least one transition metal and the reduced oxides of the at least one transition metal with the aqueous solution to form a mixture;

e. providing a reducing agent to the mixture of step d to reduce the at least one chalcogen to form solid nanoparticles of the cathode catalyst, the solid nanoparticles comprising the at least one transition metal and the at least one chalcogen in elemental form;

f. collecting the solid nanoparticles;

g. applying the cathode catalyst to the second surface of at least one of the ionomeric membrane and the second diffusion layer; and h. applying the anode catalyst to the first surface of the ionomeric membrane to form the membrane electrode assembly.

* * * * *